United States Patent
Ko et al.

(10) Patent No.: US 7,941,498 B2
(45) Date of Patent: May 10, 2011

(54) METHOD AND SYSTEM FOR INTERNET TRANSPORT ACCELERATION WITHOUT PROTOCOL OFFLOAD

(75) Inventors: Michael Anthony Ko, San Jose, CA (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/051,827

(22) Filed: Mar. 19, 2008

(65) Prior Publication Data

US 2008/0165784 A1    Jul. 10, 2008

Related U.S. Application Data

(63) Continuation of application No. 10/698,069, filed on Oct. 30, 2003, now abandoned.

(51) Int. Cl.
*G06F 15/167* (2006.01)
*G06F 15/16* (2006.01)

(52) U.S. Cl. ........................................ 709/212; 709/236

(58) Field of Classification Search ........................ None
See application file for complete search history.

(56) References Cited

U.S. PATENT DOCUMENTS

| | | | |
|---|---|---|---|
| 6,094,712 A | 7/2000 | Follett et al. | |
| 6,434,620 B1 | 8/2002 | Boucher et al. | |
| 6,449,658 B1 | 9/2002 | Lafe et al. | |
| 6,570,884 B1 * | 5/2003 | Connery et al. | 370/419 |
| 6,675,200 B1 * | 1/2004 | Cheriton et al. | 709/212 |
| 7,548,944 B2 * | 6/2009 | Sahita | 709/200 |
| 2001/0004354 A1 | 6/2001 | Jolitz | |
| 2002/0078164 A1 | 6/2002 | Reinschmidt | |
| 2002/0107971 A1 | 8/2002 | Bailey et al. | |
| 2002/0161919 A1 | 10/2002 | Boucher et al. | |
| 2002/0163888 A1 | 11/2002 | Grinfeld | |
| 2002/0172153 A1 | 11/2002 | Vernon | |
| 2003/0229710 A1 * | 12/2003 | Lie et al. | 709/231 |

FOREIGN PATENT DOCUMENTS

WO    WO0035163 A1    6/2000

* cited by examiner

*Primary Examiner* — Thu Nguyen
*Assistant Examiner* — Julian Chang
(74) *Attorney, Agent, or Firm* — Joseph C. Redmond; Mohammed Kashef

(57) ABSTRACT

A packet classifier within a network adapter detects an application packet header belonging to a packet in a data stream associated with an application that uses a network protocol, such as TCP/IP, SNA or IPX. Offsets included within the application header are identified and a plurality of registers is loaded with the identified offsets. Each of a plurality direct data placement patterns are masked with contents of the loaded registers. Each direct data placement pattern is associated with an application packet header and includes a corresponding I/O context. Additionally, each direct data placement pattern includes a corresponding connection path for direct placement of a payload corresponding to the detected application header in a memory that is utilized by the application.

24 Claims, 2 Drawing Sheets

METHOD AND SYSTEM FOR INTERNET TRANSPORT ACCELERATION WITHOUT PROTOCOL OFFLOAD

CROSS REFERENCE TO RELATED APPLICATION

The present patent application is a continuation patent application of U.S. patent application Ser. No. 10/698,069, filed Oct. 30, 2003, invented by Daniel Ko and Prasenjit Sarkar, the disclosure of which is incorporated by reference herein.

BACKGROUND

1. Field

The subject matter disclosed herein relates to a network system. More particularly, the subject matter disclosed herein to a system and a method for direct data placement of data for an application that uses a network protocol, such as TCP/IP, SNA and/or IPX.

2. Description of the Related Art

Internet protocols, such as TCP/IP, and other networking protocols, such as SNA and IPX, are crucial to the performance of many applications. The vast majority of communication protocols for current applications use TCP/IP as the transport protocol. Consequently, both researchers and practitioners have focused on performance improvements for TCP/IP.

The most popular conventional approach for improving TCP/IP performance is to offload the entire TCP/IP stack onto a network adapter. See, for example, U.S. Pat. No. 6,434,620 B1 to L. B. Boucher et al. and U.S. Patent Application 2002/0161919 A1 to L. B. Boucher et al. Offloading the entire TCP/IP stack onto a network adapter has many advantages. For example, interrupt overhead for the host processor is reduced because there is only one interrupt per TCP message as opposed to one interrupt for each TCP segment. Offloading the entire TCP/IP stack also relieves the burden of TCP/IP processing from the host processor, particularly the copy-and-checksum processing overheads, and saves precious CPU cycles. Further, offloading the TCP/IP stack provides the opportunity for direct data placement on the receive path based on application header processing on the network adapter.

A drawback of offloading the TCP/IP stack onto a network adapter, however, is that the processing power of a network adapter is not comparable to the processing power of a general purpose CPU and such offloading may cause bottlenecks. Recent studies have shown that the performance of the TCP/IP offload adapters is sometimes behind that of a software TCP/IP stack.

Consequently, what is needed is a technique for direct data placement of data for a TCP/IP application without offloading the protocol onto a network adapter.

BRIEF SUMMARY

The subject matter disclosed herein provides a technique for direct data placement of data for a TCP/IP application without offloading the protocol onto a network adapter.

The advantages of the subject matter disclosed herein are provided by a system and method for direct data placement of data for an application that uses a network protocol, such as TCP/IP, SNA or IPX. According to the subject matter disclosed herein, an application packet header is detected using a packet classifier within a network adapter. The application packet header belongs to a packet in a data stream associated with the application. Offsets included within the application header are then identified and a plurality of registers is loaded with the identified offsets. Each of a plurality direct data placement patterns are masked with contents of the loaded registers. Direct data placement of data associated with the application packet header is initiated when a result of masking a set of values corresponding to a direct data placement pattern with contents of the loaded registers matches one of at least one direct data placement pattern. Each direct data placement pattern is associated with an application packet header and includes a corresponding I/O context. Additionally, each direct data placement pattern includes a corresponding connection path for direct placement of a payload corresponding to the detected application header in a memory that is utilized by the application.

When direct data placement is initiated, information corresponding to the detected application header is extracted and the data payload of the detected applications header is DMA-ed to registered memory that is associated with the application, based on the direct data placement pattern. Only one interrupt of a host processor for the network adapter is generated for each message. Moreover, when direct data placement of data associated with the application packet header is initiated, a host processor for the network adapter does not perform copy and checksum processing.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The subject matter disclosed herein provides a technique for accelerating TCP/IP applications without offloading the TCP/IP stack onto a network adapter. Instead, the subject matter disclosed herein offloads application-programmable intelligence onto a network adapter that provides a programmable packet classifier for direct data placement for TCP applications, thereby providing most of the benefits associated with conventional offloading of the TCP/IP stack to a network adapter.

The subject matter disclosed herein provides many advantages. For example, system interrupts are reduced because the system is interrupted only on the transfer of data and not for every incoming TCP/IP packet. Additionally, TCP/IP copy overhead is eliminated because the programmable interface does direct data placement based on the classifier recognizing application headers. Moreover, direct data placement is an inbuilt advantage of the subject matter disclosed herein.

While the subject matter disclosed herein is as advantageous as a conventional system that offloads TCP/IP stack processing, the subject matter disclosed herein provides two additional benefits over such conventional systems. First, the complexity of the programmable packet classifier of the subject matter disclosed herein is much less than the complexity of the entire TCP/IP stack. Consequently, a network adapter having a programmable packet classifier of the subject matter disclosed herein is less costly. Second, the subject matter disclosed herein leaves TCP/IP processing on the host processor, thereby allowing the performance to scale with CPU speeds.

Figure 1:
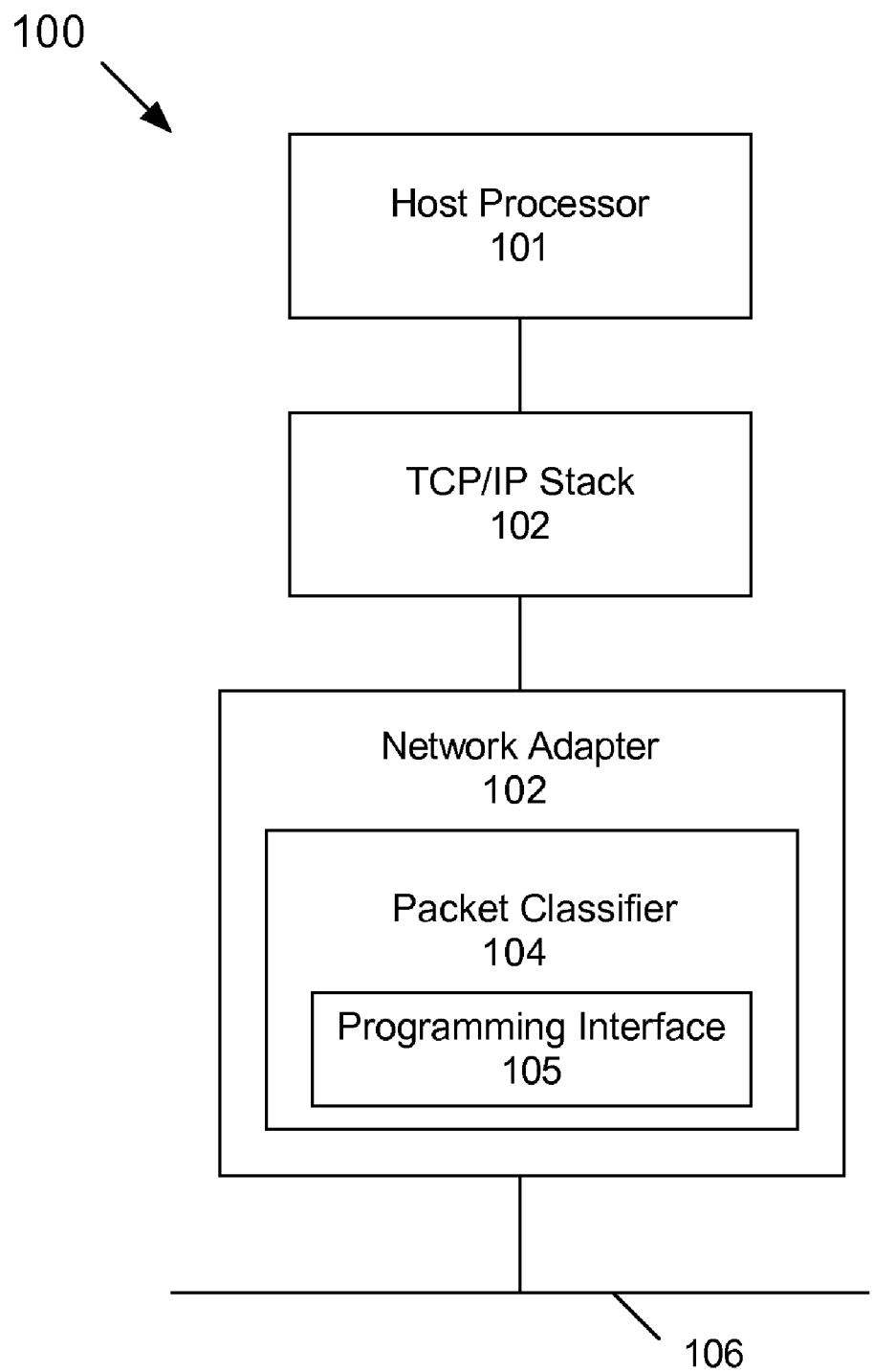
FIG. 1 shows a functional block diagram of a computer system having a network adapter with a packet classifier according to the subject matter disclosed herein.

FIG. 1 shows a functional block diagram of a computer system 100 having a network adapter with a packet classifier according to the subject matter disclosed herein. Computer system 100 includes a host processor 101, a TCP/IP stack 102 and a network adapter 103. Network adapter 103 includes a packet classifier 104 having a programming interface 105, and is connected to network 106, such as an Ethernet.

Programming interface 105 for packet classifier 104 includes a programmable interface that is programmed by a TCP/IP application. The first programmable parameter is a set of registers R that contain values that are to be loaded from a TCP stream. The second programmable parameter is the set of offsets O that indicate where the values loaded into registers R are located in the application header. The third programmable parameter is a set of masks M that are applied to the contents of registers R. The fourth programmable parameter is a set of values V that are to be matched with the results of masking the contents of registers R masked with the contents of masks M. The fifth programmable parameter is the action A that is to be taken when a pattern is matched. Action A can have additional associated parameters depending on the action taken. The application separately programs a cache of I/O tags to reserved memory RM for each corresponding I/O tag in a well-known manner.

The subject matter disclosed herein requires that the TCP stream has application header synchronization. Additionally, the subject matter disclosed herein does not provide application header resynchronization because loss of application header synchronization is usually handled by protocol action, such as by markers, or by breaking down the connection.

Figure 2:
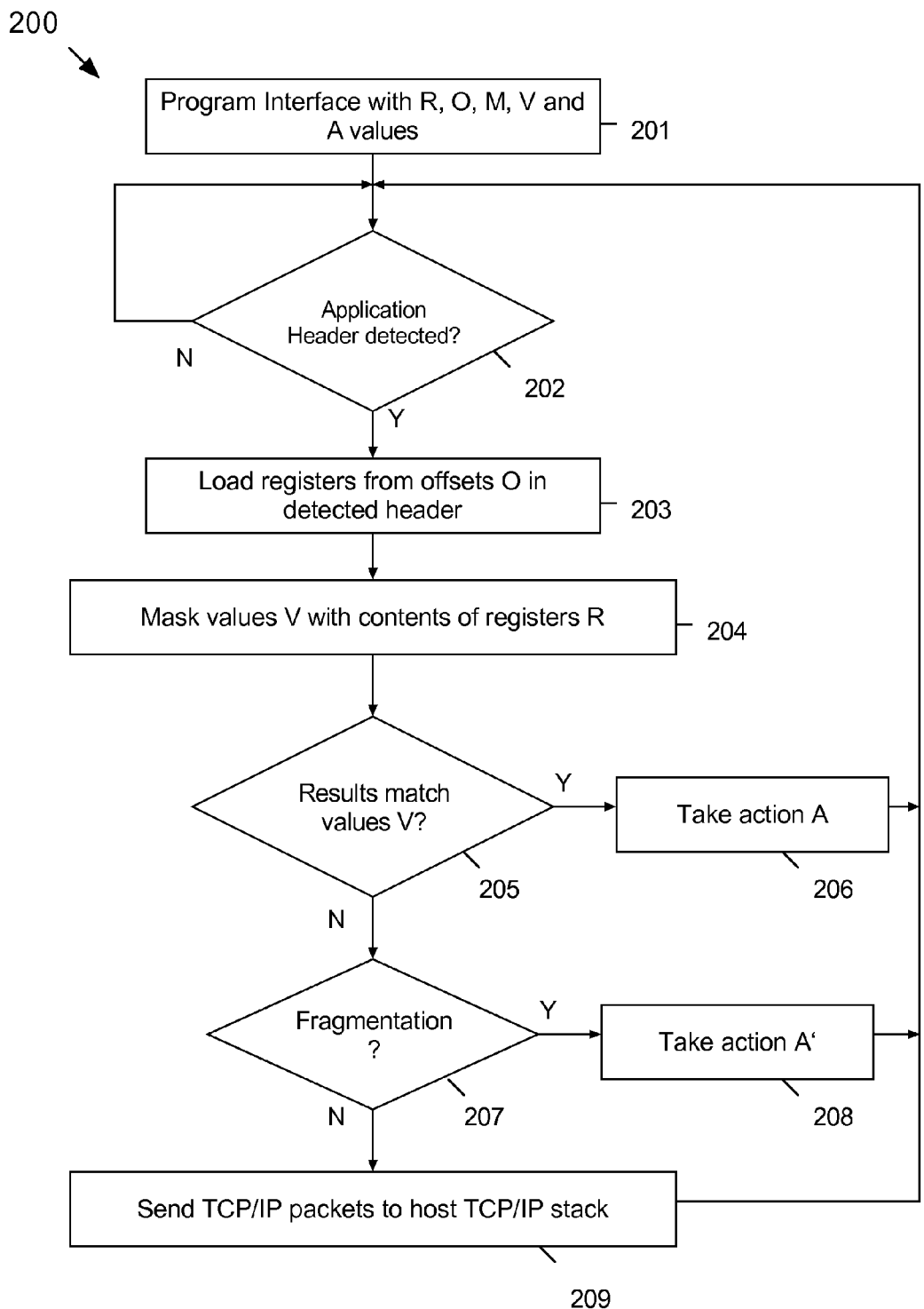
FIG. 2 show a flowchart of a process for accelerating TCP/IP applications without offloading the TCP/IP stack onto a network adapter according to the subject matter disclosed herein.

FIG. 2 show a flowchart 200 of a process for accelerating TCP/IP applications without offloading the TCP/IP stack onto a network adapter according to the subject matter disclosed herein. At step 201, a TCP/IP application programs the R, O, M, V and A programmable parameters of packet classifier 104. At step 202, TCP/IP communications are monitor by packet classifier 104 and it is determined whether an application header is detected. If not, flow remains at step 202. Otherwise, when packet classifier detects an application header, flow continues to step 203 where packet classifier 104 loads registers R from offsets O in the detected header and at step 204 masks values V with the contents of registers R. At step 205, it is determined whether the results of the masking match the results with a corresponding programmed pattern. When the results of the masking match a programmed patterned, flow continues to step 206 where packet classifier 104 takes action A that is specified in the pattern. When action A involves direct data placement, head information (i.e., I/O tags and protocol details) are extracted for DMA-ing the data payload of the of the application header to reserved memory RM associated with the application. For example, when an I/O tag corresponds to reserved memory RM1-RM2, action A involves moving the contents of TCP sequence numbers S1-S2 to RM1-RM2. Flow continues to step 202.

If, at step 205, the results of the masking do not match a programmed pattern, then flow continues to step 207 where it is determined whether there are no TCP header in incoming packets because there is IP fragmentation. If so, then flow continues to step 208 where the task of moving the contents of TCP sequence numbers is hindered by the fragmentation and is best done through action A' in which additional programming of registers R', masks M', values V' and offsets O' is done to map the fragmented IP headers to the TCP stream. Flow continues to step 202.

If, at step 207, IP fragmentation is not detected, flow continues to step 209 where the incoming TCP/IP packets doe not match any pattern because there are out-of-order packets causing missing application headers. At step 209, the incoming TCP/IP packets are sent directly to the host TCP/IP stack for processing. At this point, the TCP/IP packet is subjected to the copy-and-checksum overhead. Alternatively, the out-of-order packets are buffered in network adapter 103. For high data rates, though, this alternative increases the memory requirements of network adapter 103.

While the subject matter disclosed herein has been described using TCP/IP as an exemplary network protocol, it should be understood that the subject matter disclosed herein is applicable for other network protocols, such as SNA or IPX.

Although the foregoing subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A method for accelerating internet transport of an application that uses TCP/IP network protocol without offloading a TCP/IP stack onto a network adapter, the method comprising:

monitoring TCP/IP communications to detect an application packet header that belongs to a packet in a TCP data stream associated with said application;

if an application packet header is detected:
loading to the packet classifier, a set of registers from a set of offsets in the application packet header,
masking the contents of the set of registers loaded into the packet classifier with a set of masks, and
matching the masked contents with a direct data placement pattern represented by a set of values;

if the masked contents match a direct data placement pattern, initiating direct data placement of data associated with the application packet header, wherein said initiating comprises:
extracting header information from the application packet header, and
mapping a TCP/IP payload of the application packet header to a region of memory reserved for said application, using the extracted header information;

if the masked set of values do not match a data placement pattern, determining whether there is IP fragmentation, wherein IP fragmentation exists if there is no TCP header in the packet in the TCP data stream associated with said application; and if IP fragmentation exists, re-programming: the set of registers, a set of masks, the set of values, and the set of offsets, wherein the re-programming is done to map fragmented IP application packet headers to the TCP data stream.

2. The method according to claim 1, wherein a plurality of direct data placement patterns are available for masking with the contents of the loaded registers.

3. The method according to claim 1, wherein each direct data placement pattern comprises a corresponding I/O context.

4. The method according to claim 1, wherein each direct data placement pattern comprises a corresponding connection path for direct placement of a payload corresponding to the detected application header in a memory that is utilized by the application.

5. The method according to claim 1, further comprising generating only one interrupt of a host processor for the network adapter for each message.

6. The method according to claim 1, wherein when initiating direct data placement of data associated with the application packet header is performed, a host processor for the network adapter does not perform copy and checksum processing.

7. The method according to claim 1, wherein the network protocol comprises TCP/IP.

8. The method according to claim 1, wherein the network protocol comprises SNA.

9. The method according to claim 1, wherein the network protocol comprises IPX.

10. The method according to claim 1, further comprising:
if IP fragmentation does not exist, sending the packet in the TCP data stream (associated with said application) to the host TCP/IP stack for processing.

11. The method according to claim 1, further comprising:
if IP fragmentation does exist, buffering the packet in the TCP data stream (associated with said application) in the network adapter.

12. The method according to claim 1, further comprising:
programming an interface of parameters for the packet classifier within the network adapter, wherein the parameters comprise:
the set of registers that contain values to be loaded from the TCP data stream,
the set of offsets that indicate where values loaded into the set of registers are located in the application packet header,
the set of masks to be applied contents of the set of registers,
the set of values to be matched with results of masking the contents of the registers, and
an action comprising the direct data placement to be taken when a direct data placement pattern is matched.

13. A network adapter or accelerating internet transport of an application that uses TCP/IP network protocol without offloading a TCP/IP stack onto a network adapter, comprising:
an interface to a TCP/IP network; and
a packet classifier that:
monitors TCP/IP communications to detect an application packet header that belongs to a packet in a TCP data stream associated with said application;
if an application packet header is detected:
loads to the packet classifier, a set of registers from a set of offsets in the application packet header,
masks the contents of the set of registers loaded into the packet classifier with a set of masks, and
matches the masked contents with a direct data placement pattern represented by a set of values;
if the masked contents match a direct data placement pattern, initiates direct data placement of data associated with the application packet header, wherein said initiating comprises:
extracts header information from the application packet header, and
maps a TCP/IP payload of the application packet header to a region of memory reserved for said application, using the extracted header information;
if the masked set of values do not match a data placement pattern, determines whether there is IP fragmentation, wherein IP fragmentation exists if there is no TCP header in the packet in the TCP data stream associated with said application; and
if IP fragmentation exists, re-programs: the set of registers, the set of masks, the set of values, and the set of offsets, wherein the re-programming is done to map fragmented IP application packet headers to the TCP data stream.

14. The network adapter according to claim 13, wherein a plurality of direct data placement patterns are available for masking with the contents of the loaded registers.

15. The network adapter according to claim 13, wherein each direct data placement pattern comprises a corresponding I/O context.

16. The network adapter according to claim 13, wherein each direct data placement pattern comprises a corresponding connection path for direct placement of a payload corresponding to the detected application header in a memory that is utilized by the application.

17. The network adapter according to claim 13, wherein the packet classifier generates only one interrupt of a host processor for the network adapter for each TCP message.

18. The network adapter according to claim 13, wherein when the packet classifier initiates direct data placement of data associated with the application packet header is performed, a host processor for the network adapter does not perform copy and checksum processing.

19. The network according to claim 13, wherein the network protocol comprises TCP/IP.

20. The network according to claim 13, wherein the network protocol comprises SNA.

21. The network according to claim 13, wherein the network protocol comprises IPX.

22. The network adapter according to claim 13, further comprising:
if IP fragmentation does not exist, sending the packet in the TCP data stream (associated with said application) to the host TCP/IP stack for processing.

23. The network adapter according to claim 13, further comprising:
if IP fragmentation does exist, buffering the packet in the TCP data stream (associated with said application) in the network adapter.

24. The network adapter according to claim 13, wherein the interface comprises parameters for the packet classifier within the network adapter, wherein the parameters comprise:
the set of registers that contain values to be loaded from the TCP data stream,
the set of offsets that indicate where values loaded into the set of registers are located in the application packet header,
the set of masks to be applied contents of the set of registers,
the set of values to be matched with results of masking the contents of the registers, and
an action comprising the direct data placement to be taken when a direct data placement pattern is matched.

* * * * *